Nov. 21, 1933.  A. E. DRAKE ET AL  1,935,976
COMBINED BREAD BOX AND SLICER
Filed June 6, 1930   2 Sheets-Sheet 2
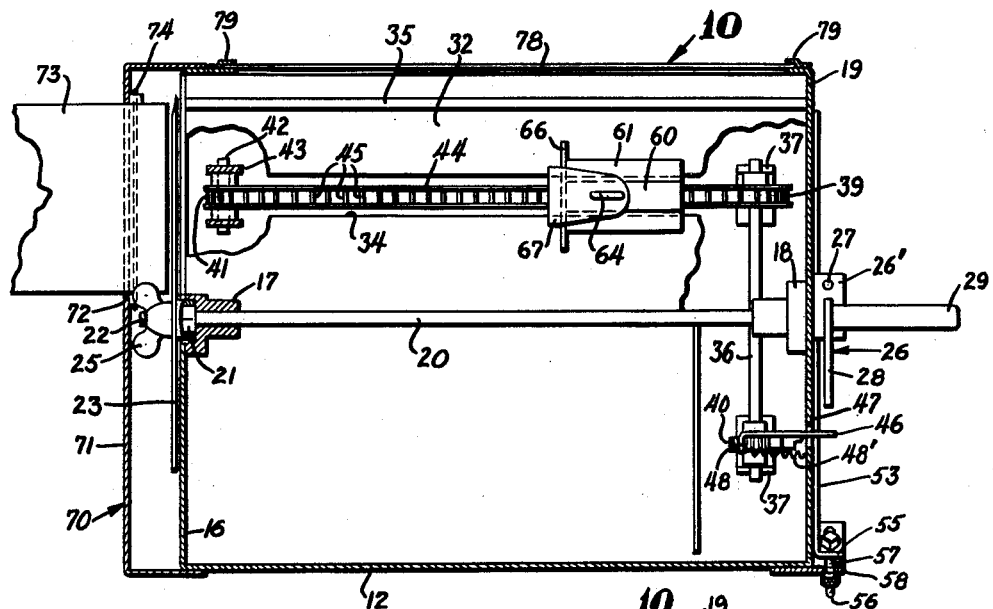
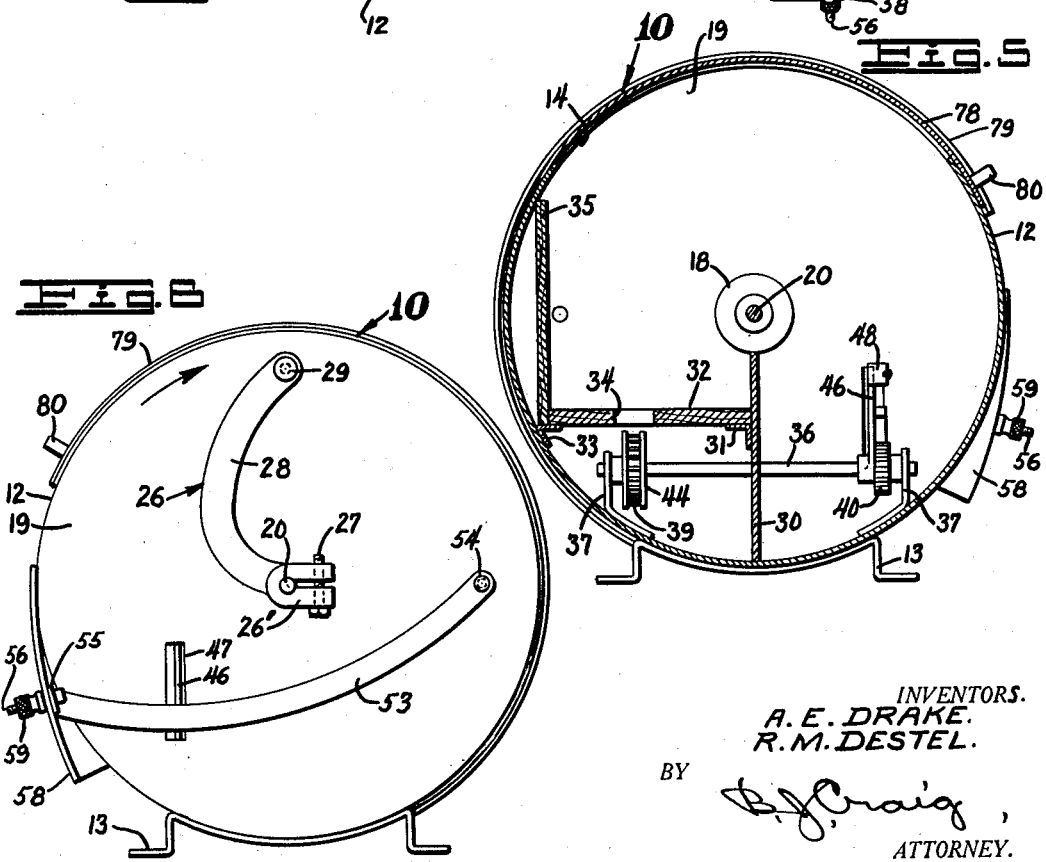
INVENTORS.
A. E. DRAKE.
R. M. DESTEL.
BY B. J. Craig,
ATTORNEY.

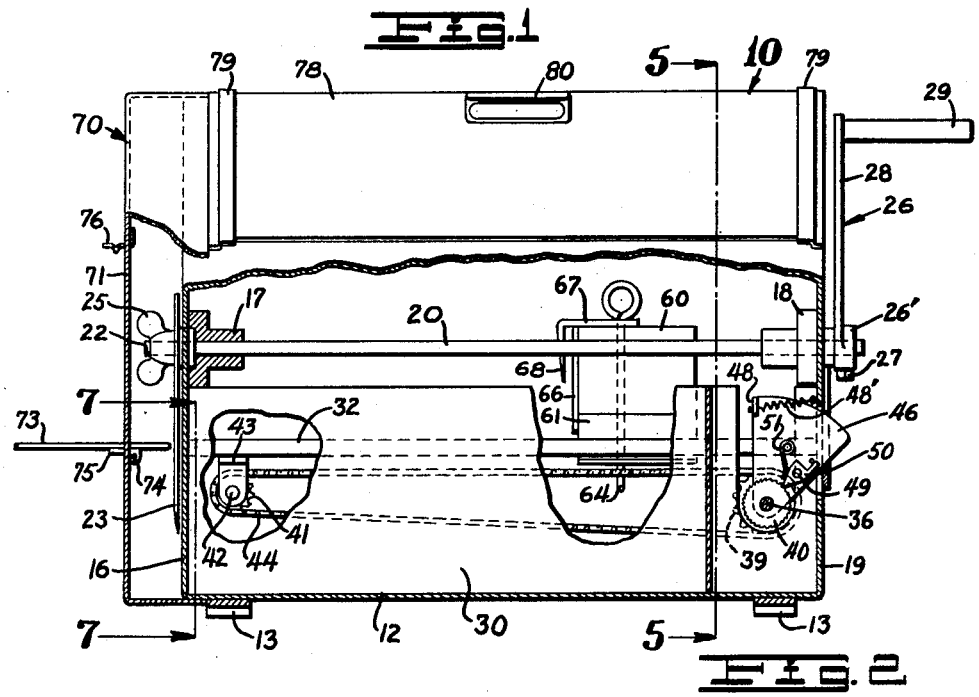
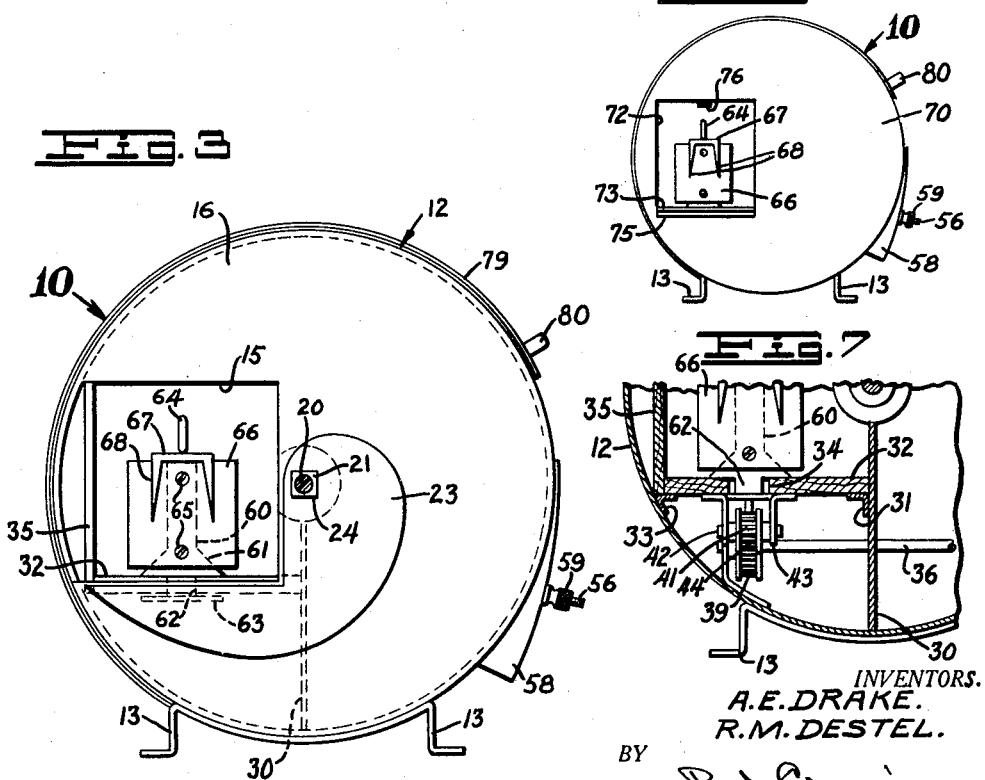

Patented Nov. 21, 1933

1,935,976

UNITED STATES PATENT OFFICE 1,935,976

COMBINED BREAD BOX AND SLICER

Alfred E. Drake and Richard M. Destel, Los Angeles, Calif.

Application June 6, 1930. Serial No. 459,434

3 Claims. (Cl. 146—113)

This invention relates to bread boxes.

The general object of our invention is to provide an improved receptacle for bread.

The specific object of this invention is to provide a bread box having built in means to slice a loaf of bread.

Another object of the invention is to provide a bread slicer with novel means for moving bread towards the slicing means.

A further object of the invention is to provide a bread slicer with novel means for regulating the size of slice to be cut.

Other objects and the advantages of this invention will be apparent from the following description taken in connection with the accompanying drawings wherein:

Fig. 1 is a side elevation of our improved bread box with portions thereof broken away to more clearly illustrate the invention.

Fig. 2 is an end view of the delivery end of the device on a reduced scale.

Fig. 3 is a view of the delivery end of the device with the cap removed.

Fig. 4 is a longitudinal plane section through the device.

Fig. 5 is a section taken on line 5—5 of Fig. 1.

Fig. 6 is a view of the operating end of the device and

Fig. 7 is a fragmentary section taken on line 7—7 of Fig. 1.

Referring to the drawings by reference characters we have indicated our improved bread box generally at 10. As shown this device comprises a cylindrical container 12 supported on a plurality of legs 13 and having an aperture 14 therein in the upper wall thereof and an aperture 15 in the front wall 16. This aperture 15 is positioned at one side of the longitudinal axis of the device.

Mounted in a bearing 17 on the front wall 16 and a bearing 18 on the rear wall 19 we provide a shaft 20 which includes a polygonal portion 21 adjacent the front and a threaded portion 22.

Mounted on the shaft 20 adjacent the outer face of the front wall 16 we provide a slicing knife 23 which includes a polygonal aperture 24 adapted to receive the polygonal portion 21 of the shaft. The knife 23 is shown as clamped to the polygonal portion 21 by a wing nut 25 which engages the threaded portion 22 of the shaft.

On the opposite end of the shaft 20 adjacent the outer face of the rear wall 19 we provide an operating member 26 which includes a split apertured hub 26' adapted to be clamped to the shaft by a bolt 27 and an arm 28 which is spaced from the rear wall 19 and is provided with a handle 29.

From the foregoing it will be apparent that when the operating member 26 is rotated the shaft 20 will be rotated and in turn will rotate the knife 23.

Extending longitudinally of the device we provide a vertical partition 30 which is preferably secured to the container by soldering or welding it thereto or in any other suitable manner and is provided with a bracket or brackets 31 which are adapted to support one side of a horizontal platform 32. The opposite side of the platform is shown as supported by a bracket or brackets 33 mounted on the container.

The platform 32 is loose on the brackets 31 and 33 and is provided with a longitudinal slot 34. Adjacent the outer side of the platform 32 and extending along the side of the device we provide a guide 35 which is supported on the bracket 33.

Adjacent the rear of the container we provide a shaft 36 positioned in bearings 37 which are mounted on the container 12. Adjacent one end of the shaft 36 we secure a sprocket 39 and adjacent the other end of the shaft we secure thereto a ratchet 40.

Adjacent the front of the container we provide a sprocket 41 mounted on a shaft 42 positioned in bearings 43 which are secured to the under face of the platform 32 (see Figs. 1 and 7). Positioned on the sprockets 39 and 41 we provide a sprocket chain 44 which includes a plurality of spaced pivot pins 45. This sprocket chain is positioned directly below the slot 34 in the platform 32.

Loosely mounted on the shaft adjacent the ratchet 40 we provide a segmental actuating member 46 which is adapted to extend out through an aperture 47 in the rear end 19 of the container and is provided with an angular lip 48 to which one end of a coiled spring 48' is secured, the opposite end being anchored to the wall 19. Pivotally secured to the member 46 as at 49 we provide a pawl or dog 50 which is normally urged into engagement with the teeth of the ratchet 40 by a resilient member 51.

When the operating member 26 is rotated in the direction indicated by the arrow in Fig. 6 the arm 28 thereof engages the segmental member 46 and upon a continued movement of the arm 28 the member 46 is moved inward, whereupon the dog 50 rotates the ratchet 40 which in turn rotates the shaft 36 thereby rotating the sprocket 39, which causes the sprocket chain 44 to travel towards the front of the container.

After the arm 28 passes the member 46 the spring 48' moves the member 46 rearward to its initial position.

For regulating the amount of movement of the member 46 and thereby regulating the distance the chain 44 travels each time the member 46 moves inward, we provide an arm 53. This arm is pivoted adjacent one end to the rear wall 19 of the container as at 54 and the opposite end of the arm is provided with an angular lip 55 which is adapted to support a bolt 56. This bolt is positioned in an elongated aperture 57 in an arcuate member 58 secured to the container and has positioned thereon a thumb nut 59 which is adapted to clamp the lip 55 of the arm 53 to the arcuate member 58.

To lessen the movement of the segmental member 46 the arm 53 is raised and to lengthen the movement of the segmental member 46 the arm 53 is lowered so that the feed is thus adjusted.

Mounted on the platform 32 we provide a block 60 which includes an enlarged portion 61 wider than the slot 34 and a tongue 62 which extends through the slot 34 and has secured to the under surface thereof a plate 63 which is of greater width than the slot 34.

The block 60 and the plate 63 are each provided with an aperture in which a pin 64 is positioned. This pin extends below the bottom of the plate 63 and is adapted to be positioned between pairs of the pivot pins 45 of the links of the sprocket chain 44. Thus when the chain 44 travels forward the block 60 will be moved with it through the medium of the pin 64. Secured to the front face of the block 60 as by countersunk screws 65 we provide a pusher plate 66.

Secured to the pin 64 we provide a holder 67 which includes a plurality of downwardly extending prongs 68 which are spaced forward of the front face of the pusher plate 66.

On the front end of the container 12 we provide a cover 70 which tightly engages the outer surface of the container, and includes a front wall 71 which is spaced from the front wall of the container, and an aperture 72 in alignment with the aperture 15 of the container.

Associated with the aperture 72 we provide a closure member 73 which is pivotally connected as at 74 to the front wall 71 of the cover and is adapted when in an open position to rest on a lip 75 turned out from the cover, thus forming a horizontal shelf. To retain the closure 73 in a closed position we provide a spring finger 76 which is secured to the wall 71 of the cover and is adapted to engage the end of the closure member when the closure is moved to a closed position.

The aperture 14 is shown as adapted to be closed by a plate 78 which is shaped to conform to the surface of the container 12. The plate 78 is adapted to be retained in position on the outer surface of the container by guides 79 and for moving the closure plate 78 we provide a handle 80 thereon.

In operation the pin 64 is raised and the block 60 moved rearwardly as far as necessary, depending on the length of the loaf of bread to be sliced. A loaf of bread is then positioned on the platform 32 with one end abutting the pusher plate 66 and then the pin 64 is moved downwardly thereby positioning the lower end thereof between a pair of the sprocket chain pivot pins 45 and at the same time inserting the prongs 68 into the bread. Should the closure plate 73 be in a closed position it is opened and the device is in readiness to be operated.

To slice the bread the operator rotates the operating member in the direction indicated by the arrow in Fig. 6. As previously described when the operating member is thus rotated the arm 28 thereof engages the segmental member 46 and moves it inwardly thereby rotating the shaft 36 and causing the block 60 to travel forwardly. As the block 60 travels forwardly it moves the bread through the aperture 15 in the front wall 16 of the container into the path of the knife 23, which upon continued rotation of the operating member 26 will cut through the bread and sever a slice therefrom which falls upon the shelf formed by the open closure plate 73.

Upon continuous rotation of the operating member 26 the bread is fed forwardly intermittently and sliced. When the entire loaf has been sliced the pin 64 is moved upwardly and the block 60 moved rearwardly and a new loaf placed in position to be cut.

The portion of the container adjacent the side opposite the platform 32 is adapted to be used for storing loaves of bread.

From the foregoing description it will be apparent that we have provided a novel bread box which is simple in construction and efficient in use.

Having thus described our invention we claim:

1. In a device of the class described, a container including a front wall having an aperture and a rear wall, said front wall having a horizontal platform in said container, said platform being in line with said aperture, there being a longitudinal slot in said platform, a bearing on said front wall and a bearing on said rear wall, a shaft supported in said bearings, a knife secured to said shaft adjacent the outer face of said front wall, an operating member secured to said shaft, a transverse shaft adjacent said rear wall, means to support said shaft, a sprocket secured to said shaft, said sprocket being in line with said platform slot, a second sprocket adjacent said front wall, said second sprocket being mounted on a second shaft and means to support said second shaft, a sprocket chain supported by said sprockets in line with said platform slot, a ratchet secured to said first transverse shaft, an actuating member loosely mounted on said shaft adjacent said ratchet, a dog pivotally mounted on said actuating member, means to resiliently urge said dog into engagement with said ratchet, there being an aperture in said rear wall, said actuating member having a portion thereof extending through said last mentioned aperture, said operating member being disposed adjacent to said actuating member and being adapted upon rotation thereof to engage said protruding portion of said actuating member and move it thereby rotating said ratchet, said first transverse shaft and said first sprocket thereby moving the upper reach of said sprocket chain towards said front wall, a block positioned on said platform, said block including a tongue extending through said slot, a vertical pin carried by said block, said pin extending below the surface of said block and engaging said sprocket chain whereby when said chain is moved said block is moved.

2. In a device of the class described, a container including a front wall having an aperture and a rear wall, a horizontal platform in said container, said platform being in alignment with said aperture, a shaft mounted beneath said platform, a ratchet keyed to said shaft, an actuating member comprising a lever loosely mounted on said shaft adjacent to said ratchet, said lever having a free end portion projecting through said rear wall, bread advancing means extending through said platform, said advancing means including a linearly moving member driven by said shaft, means connecting said ratchet and said lever whereby when said lever is rocked said advancing means will be moved, adjustable means to limit the movement of said lever through said rear wall, said adjusting means including a pivoted lever engaging said first lever, said pivoted lever having its axis at right angles to the axis of the first lever, means to hold said pivoted lever in adjusted position, a second shaft mounted on said container, an operating crank on said second shaft, said lever being normally disposed in the path of movement of said crank whereby when the crank is rotated a loosely mounted lever is rocked and a knife disposed on said second shaft in the path of movement of bread advanced by said bread advancing means.

3. In a device of the class described, a container including a front wall having an aperture and a rear wall, a horizontal platform in said container, said platform being in line with said aperture, a longitudinal slot in said platform, a bearing on said front wall and a bearing on said rear wall, a shaft supported in said bearings, a knife secured to said shaft adjacent the outer face of said front wall, a crank secured to said shaft, a transverse shaft adjacent said rear wall and beneath said platform, means to support said transverse shaft, a sprocket secured to said transverse shaft, said sprocket being in line with said platform slot, a second sprocket adjacent said front wall, said second sprocket being mounted on a third shaft, means to support said third shaft, a sprocket chain supported by said sprocket in line with said platform slot, a pivoted lever mounted on said transverse shaft, said lever having a free end, means whereby when said lever is rocked it moves said transverse shaft, said lever having its free end disposed directly in the path of said crank whereby upon rotation of said crank said transverse shaft will be rotated thereby moving the upper reach of said sprocket chain towards said front wall, a block positioned on said platform, said block including a tongue extending through said platform slot, a vertical pin carried by said block, said pin extending below the surface of said block and engaging said sprocket chain whereby when said chain is moved said block is moved, said pin being movable out of engagement with said chain.

ALFRED E. DRAKE.
RICHARD M. DESTEL.